(12) United States Patent
Amar et al.

(10) Patent No.: US 7,818,924 B2
(45) Date of Patent: Oct. 26, 2010

(54) FOAM INSULATION/SHADING SYSTEM FOR TRANSPARENT STRUCTURES

(75) Inventors: Dror Amar, Montreal (CA); Stephen Vineberg, Montreal (CA)

(73) Assignee: Sunarc of Canada Inc., Montreal, Quebec (CA)

( * ) Notice: Subject to any disclaimer, the term of this patent is extended or adjusted under 35 U.S.C. 154(b) by 186 days.

(21) Appl. No.: 11/518,130

(22) Filed: Sep. 11, 2006

(65) Prior Publication Data
US 2007/0069411 A1    Mar. 29, 2007

Related U.S. Application Data

(63) Continuation of application No. PCT/CA2005/000360, filed on Mar. 9, 2005.

(60) Provisional application No. 60/551,072, filed on Mar. 9, 2004, provisional application No. 60/616,632, filed on Oct. 8, 2004.

(51) Int. Cl.
*E04B 1/62* (2006.01)

(52) U.S. Cl. .............. 52/168; 261/DIG. 26; 239/208; 239/433

(58) Field of Classification Search .............. 52/171.3, 52/168; 261/DIG. 26; 239/208, 433, 575
See application file for complete search history.

(56) References Cited

U.S. PATENT DOCUMENTS

| | | | | |
|---|---|---|---|---|
| 3,342,271 A | * | 9/1967 | Anthony, Jr. | ................. 169/15 |
| 3,419,082 A | * | 12/1968 | O'Regan et al. | .............. 169/15 |
| 3,512,761 A | * | 5/1970 | Lundberg et al. | .............. 261/25 |
| 3,533,473 A | * | 10/1970 | Jamison | ....................... 169/44 |
| 3,667,687 A | * | 6/1972 | Rivking et al. | ........... 239/553.3 |
| 3,672,184 A | * | 6/1972 | Zeilon | ........................ 62/324.3 |
| 3,723,340 A | * | 3/1973 | Shepherd | ..................... 516/10 |
| 3,750,754 A | * | 8/1973 | Stults | ............................ 169/9 |
| 4,352,259 A | | 10/1982 | Smith et al. | |
| 4,562,674 A | * | 1/1986 | Nelson | ..................... 52/171.3 |
| 6,010,083 A | * | 1/2000 | Roe et al. | ................ 239/427.5 |
| 6,523,616 B1 | * | 2/2003 | Wallace | ....................... 169/70 |
| 6,575,234 B2 | * | 6/2003 | Nelson | ....................... 165/247 |

FOREIGN PATENT DOCUMENTS

| | | |
|---|---|---|
| CA | 2324318 | 4/2002 |
| CA | 2324318 A1 * | 4/2002 |
| FR | 2 575 082 | 6/1986 |
| WO | WO 92/11926 | 7/1992 |

\* cited by examiner

*Primary Examiner*—Brian E Glessner
*Assistant Examiner*—Adriana Figueroa
(74) *Attorney, Agent, or Firm*—Ogilvy Renault LLP

(57) ABSTRACT

A periodically shieldable solar structure (10) comprises a cavity formed between a pair of light transmitting members (12). A foam insulation/shading system (14) is provided for periodically filling the cavity with degradable foam. The foam insulation/shading system (14) comprises a series of foam generators (28) mounted within the cavity and distributed therealong to provide multiple foam generating points therewithin. The foam generators (28) are operatively coupled to a source of pressurized air and a source of foaming solution.

6 Claims, 5 Drawing Sheets

FOAM INSULATION/SHADING SYSTEM FOR TRANSPARENT STRUCTURES

RELATED APPLICATIONS

This is a continuation of International Patent Application No. PCT/CA2005/000360 filed Mar. 9, 2005, which claims benefit of U.S. Provisional Applications No. 60/551,072 filed Mar. 9, 2004 and No. 60/616,632 filed Oct. 8, 2004.

BACKGROUND OF THE INVENTION

1. Field of the Invention

The present invention relates generally to foam generation systems used in the insulation and/or shading of transparent structures such as greenhouses, atriums, etc.

2. Description of the Prior Art

Building structures having cavities formed between double light transmitting roof or wall membranes for receiving degradable or replaceable foam insulation are known. The roof and wall cavities can be periodically filled with degradable foam to provide shading or thermal insulation. However, when it is desired to let the light pass through the building envelope in order to take advantage of the solar energy, the foam can be readily dissolved and removed from the cavities. Examples of such buildings can be found in U.S. Pat. Nos. 3,672,184 and 4,562,674.

The foam generators used in the above mentioned patents for filling the roof and wall cavities with foam bubbles essentially consist of a fan spraying a soap solution onto a screen at the entry of the wall and roof cavities. One drawback of such large fan system is that it is difficult to adapt to existing structure. Such particular systems require that the thickness in the cavity between the membranes be large enough to accommodate the fan generator. Also, the foam generated with this type of system cannot be placed anywhere desired. This creates additional difficulties for more complex roofing structures. Finally, large fan foam generator generates foam characterized by large bubbles and thus having a lower insulation value.

SUMMARY OF THE INVENTION

It is therefore an aim of the present invention to provide a new foam generator arrangement for periodically shading or insulating a transparent building structure or other light transmitting structures.

Therefore, in accordance with a general aspect of the present invention, there is provided a periodically shieldable solar structure comprising at least one cavity formed between a pair of light transmitting members, and a foam insulation/shading system for periodically filling said at least one cavity with degradable foam, said foam insulation/shading system comprising an air supply pipe connected to a source of low-pressure air and extending along said at lease one cavity, a foaming solution supply pipe connected to a source of foaming solution and extending along said at least one cavity, and a series of axially spaced-apart foam generators mounted within said at least one cavity and distributed therealong to provide multiple discrete foam generating points therewithin, the foam generators being located in an upper end portion of the at least one cavity, the low pressure air and the foaming solution being separately supplied to said foam generators via said air supply pipe and said foaming solution supply pipe, each of the foam generators having a body defining a chamber, the chamber having an outlet provided with a screen, each foam generator further having an air inlet configured to provide for a flow of low-pressure air from the air supply pipe to the chamber and at least one nozzle connected to the foaming solution pipe for spraying the foaming solution onto an inner face of the screen such that foam is generated by the low-pressure air released through the screen.

In accordance with a further general aspect of the present invention, there is provided a foam insulation/shading system in combination with a transparent building structure having at least one cavity formed between a pair of light-transmitting members, the system comprising a source of low-pressure air, a source of foaming solution, and a series of foam generators mounted at axially spaced-apart locations along an upper end portion of the at least one cavity to provide discrete foam generating points therealong, each of said foam generators comprising a hollow head member defining an internal volume and having a porous outlet face and an air inlet connected to the source of low-pressure air for directing air through said porous outlet face, and at least one nozzle connected to the source of foaming solution and arranged for spraying the foaming solution onto said porous outlet face.

In accordance with a foam generator for generating degradable insulation/shading foam within a roof/wall cavity of a transparent building structure, the foam generator comprising a source of air at low pressure, a head member carrying a screen and having an air inlet adapted to be connected to the source of air at low pressure for directing the air through the screen, and at least one nozzle mounted to said head member at an angle to a central axis of the head member and adapted to be connected to a source of foaming solution to spray the foaming solution onto the screen independently of the air, the screen being substantially normal to said central axis.

In accordance with a still further general aspect of the present invention, there is provided a method of filling a cavity with insulation/shading foam, comprising a) spraying a foaming solution onto a screen, and b) flowing air at low pressure through the screen to cause foam to fall out from the screen into the cavity.

In accordance with a still further general aspect of the present invention, there is provided a foam generating apparatus and method which incorporates a mixing chamber, such as a Venturi-type pressure differential injector, compressed air, and pressurized liquid soap, to produce a high flow of relatively dry yet dynamic foam, which is significantly light and durable.

The term "screen" is herein intended to cover any mesh material, interweaved or intermingled material defining a porous network through which foam can be generated.

BRIEF DESCRIPTION OF THE DRAWINGS

Reference will now be made to the accompanying drawings, showing by way of illustration a preferred embodiment thereof, and in which.

DESCRIPTION OF THE PREFERRED EMBODIMENTS

As will be seen hereinafter, the first embodiment of the present invention is generally directed to a low pressure foam generator for producing foam bubbles in order to periodically insulate or shade solar structures of many different types. The example shown in the Figures is applied to a greenhouse. However, it is understood that the present invention could also be installed in other types of transparent structures, such as atriums, residential, commercial or industrial buildings to name a few.

Figure 1:
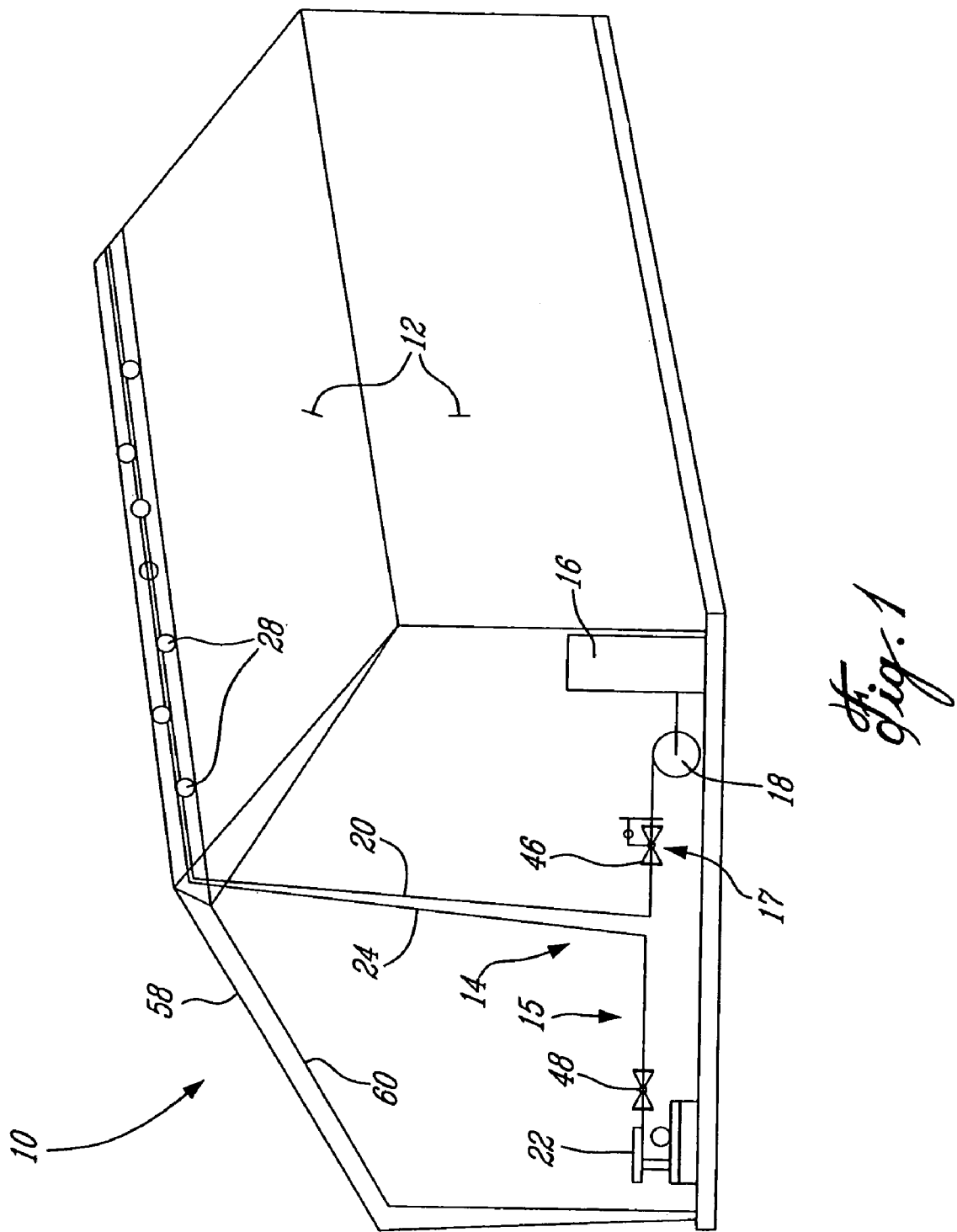
FIG. 1 is a schematic perspective view of a low pressure foam generation system used in the insulation and/or shading of a greenhouse in accordance with one embodiment of the present invention.

Now referring to FIG. 1, there is shown a greenhouse 10 having a conventional skeletal framework including among others a number of vertical supporting columns and transversal horizontal trusses. The greenhouse 10 has a double layer covering membrane 12 stretched over its skeletal framework. The double layer covering membrane 12 can be made out of a polyethylene sheet or other materials such as polycarbonate, glass or other forms of plastic to form the skin of the greenhouse 10.

The wall and roof cavities (not shown) defined between the inner and the outer layers of the double layer covering membrane 12 are connected to a low pressure foam generation system 14 generally comprising two independent, automatically controlled, air and liquid supply systems 15 and 17, and a plurality of axially spaced-apart foam generating assemblies 28. The distance between the foam generating assemblies 28 depends on the wall and roof cavity's volume, thus height of walls, width of roof, and distance between the inner and the outer layers of the double layer covering membrane 12. The liquid supply system 17 generally comprises a foaming solution reservoir 16, a pump 18 and a foaming solution feed or supply line 20. The air supply system 15 generally comprises an air compressor 22 and a compressed air feed or supply line 24.

The reservoir 16 contains a foaming solution consisting essentially of a surfactant and water. The foaming solution can be provided in the form of a concentrated solution derived from a hydrolyzed protein concentrate base, such as used in the fire fighting foam art. Although the preferred liquid is water, it is understood that other liquids compatible with the surfactant could be used as well.

Figure 2:
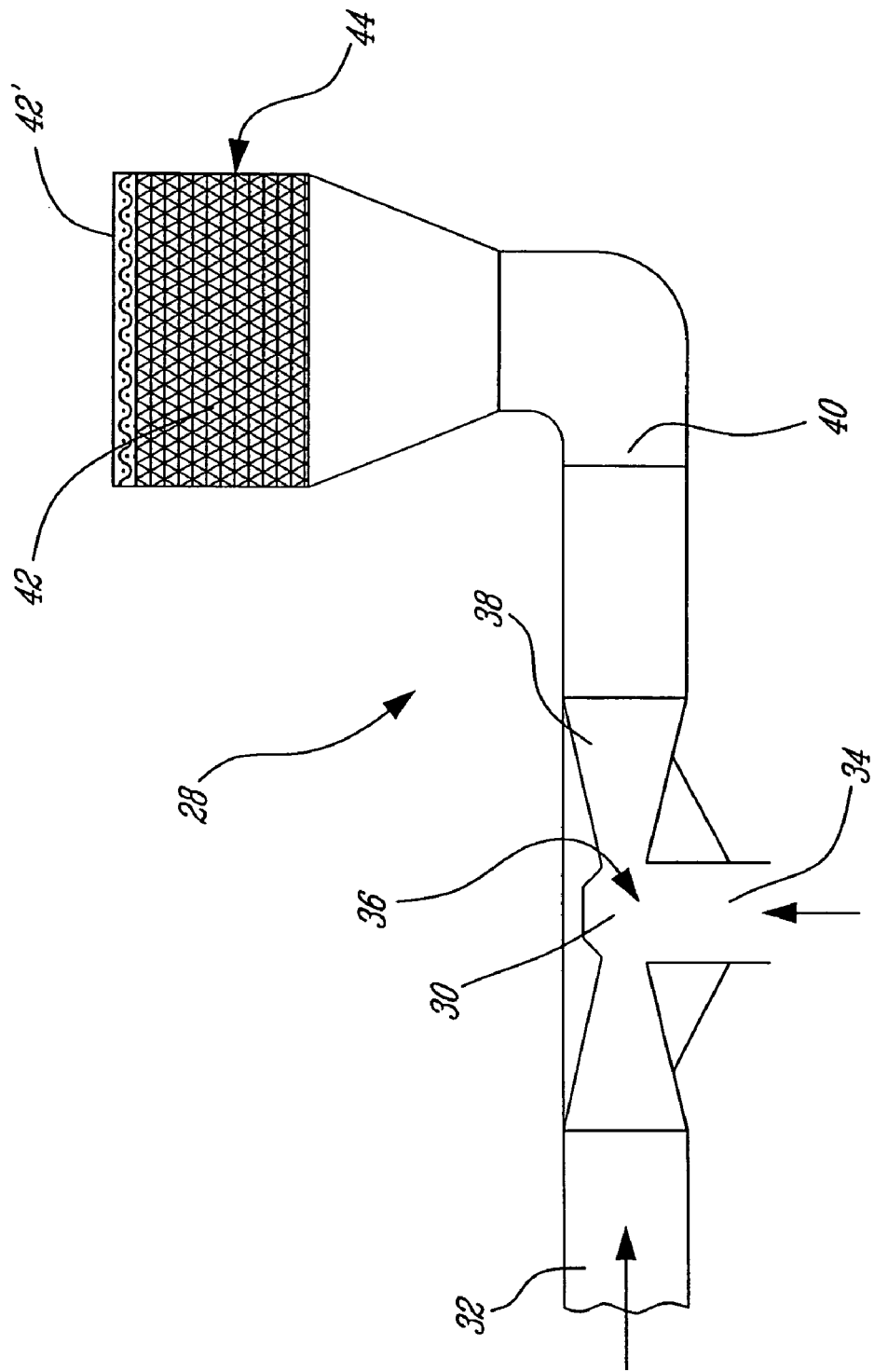
FIG. 2 is a cross section of a Venturi injector of the low pressure foam generation system showing the entry sides of the compressed air and the liquid surfactant mix, as well as the mesh where actual foam bubbles are formed.

As shown in FIG. 2, each foam generating assembly 28 can generally comprise a Venturi injector or eductor 30 having a motive flow inlet 32, a suction or induced flow inlet 34, an injection chamber 36 and an ejector outlet 38. The motive flow inlet 32 is connected in fluid flow communication with the air supply line 24. The suction inlet 34 is connected in fluid flow communication with the foaming solution supply line 20. The ejector outlet 38 is connected in fluid flow communication with a chamber 40 defining a 90 degrees bent from horizontal to vertical and leading to a manifold of packed mesh 42 placed inside a vertically oriented cylindrical head 44. The chamber 40 has a conical distal end portion of increasing cross-section. The Venturi injector or educator type generator has to be vertically oriented in order to ensure an even distribution of the foaming solution and air mixture across the manifold of packed mesh. When the Venturi injector or educator type generator is placed horizontally the foaming solution, through gravity, tends to separate from the mixture of the foaming solution and the air, resulting in an uneven coverage of the manifold of packed mesh. This leads to an inefficient process where only a certain area of the manifold of packed mesh is being utilized for foam generation. Furthermore, area of the manifold of packed mesh that is not being exploited for foam generation provides an easy way for air to escape resulting in an inefficient use of the pressurized air.

In use, the compressed air and the foaming solution are independently fed to the foam generating assemblies 28 via feed lines 24 and 20, respectively. Control valves 46 and 48 are respectively provided in the feed lines 20 and 24 to independently adjust the flow of compressed air and foaming solution. One of the valves in the foaming solution supply line 20 downstream of the pump 18 is a mechanical valve used for flow control and the second valve is an electrical valve used to close or open the line 20. The pump 18 is used to pump the foaming solution at a low pressure to the roof of the greenhouse 10 where the foam generating assemblies 28 are located.

Air compressed to a pressure of about 3 to about 10 PSI (measured at compressor outlet) enters the inlet 32 of the eductor 30 where it is constricted toward the injection chamber 36, and changes into a high-velocity jet stream. The increase in velocity through the injection chamber 36 results in a decrease in pressure, thereby enabling the foaming solution (i.e. the mix of water and surfactant) to be drawn through the induced flow inlet 34 and be entrained into the air stream. As this new mixture of compressed air and liquid soap is diffused toward the injector outlet 38, its velocity is reduced and it is reconverted into pressure energy. This pressure is lower than the inlet pressure. The new combination of air and liquid is mixed in the mixing chamber 40 before being forced through the manifold of packed mesh 42. As this new mixture of air and liquid soap is forced through the mesh material, it is transformed into high quality (small bubble) foam. It is important to note that in this application, the liquid may be pumped in by maintaining a desired pressure in the liquid supply system 17.

It is noted that using the foaming solution as the motive fluid would result in very wet dense foam, with a much lower volume. Wet foam should be avoided in insulation application.

A main advantage of the above system is that foam is produced at a specific point, called the point of mixture, which can be placed at any desired location. Compressed air and pressurized foaming solution are transported independently to the point of mixture by the air and liquid supply systems 15 and 17. This arrangement thus can be used for many types of structure, whose roofs are not uniformly shaped, enabling full foam insulation coverage.

The quality of foam can be characterized by the size of its bubbles, which can range between 1 to 5 mm. The initial wetness of the foam is another characteristic.

In this apparatus a desired quality of foam is produced by:
1) Controlling the ratio of air to liquid, which can be adjusted by:
   a) varying the airflow and/or pressure entering the eductor 30
   b) varying the liquid flow and/or pressure entering the suction inlet 34
   c) varying both air and liquid
2) Varying the concentration of surfactant in the liquid mix from 2% to 10%
3) Using different types and sizes of packed mesh Automatic control of the system is accomplished by a computerized control panel that controls the operating of the equipment and of the valves 46 and 48.

Figure 3:
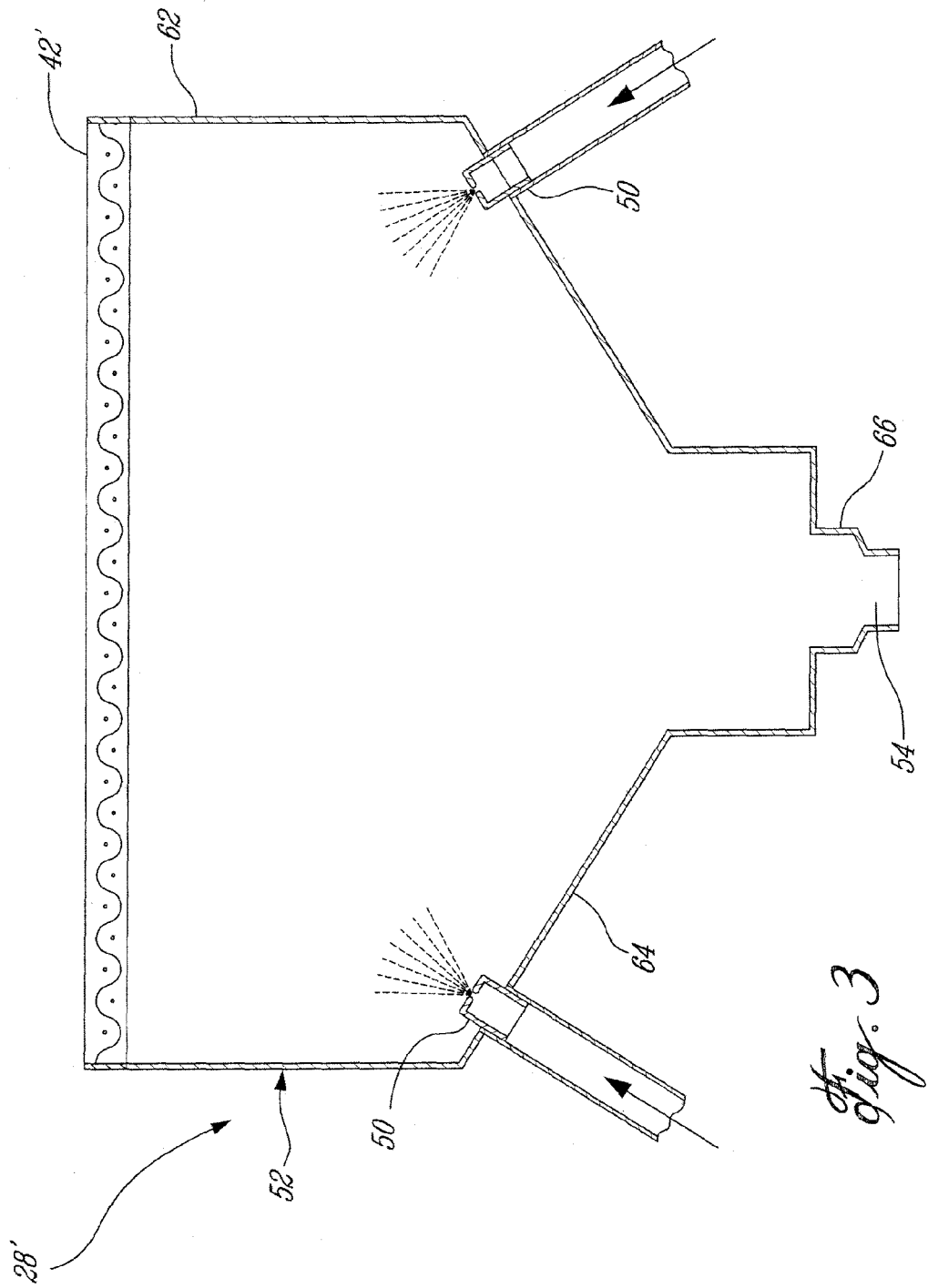
FIG. 3 is a cross section of a low pressure foam generator in accordance with a second embodiment of the present invention.
Figure 4:
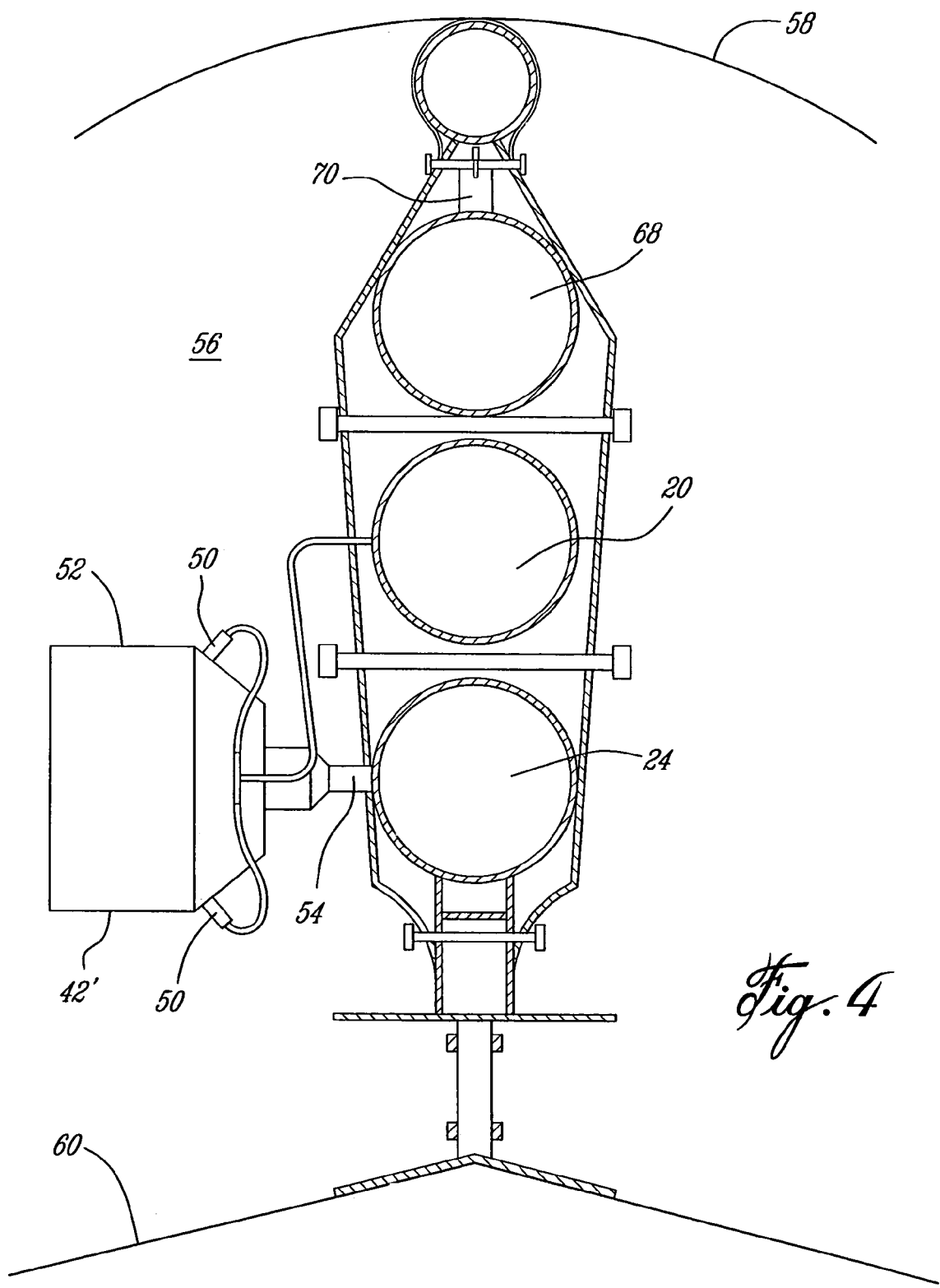
FIG. 4 is a schematic cross-sectional end view showing one of the low pressure foam generators mounted to an air supply pipe extending axially centrally through a roof cavity of a building structure.
Figure 5:
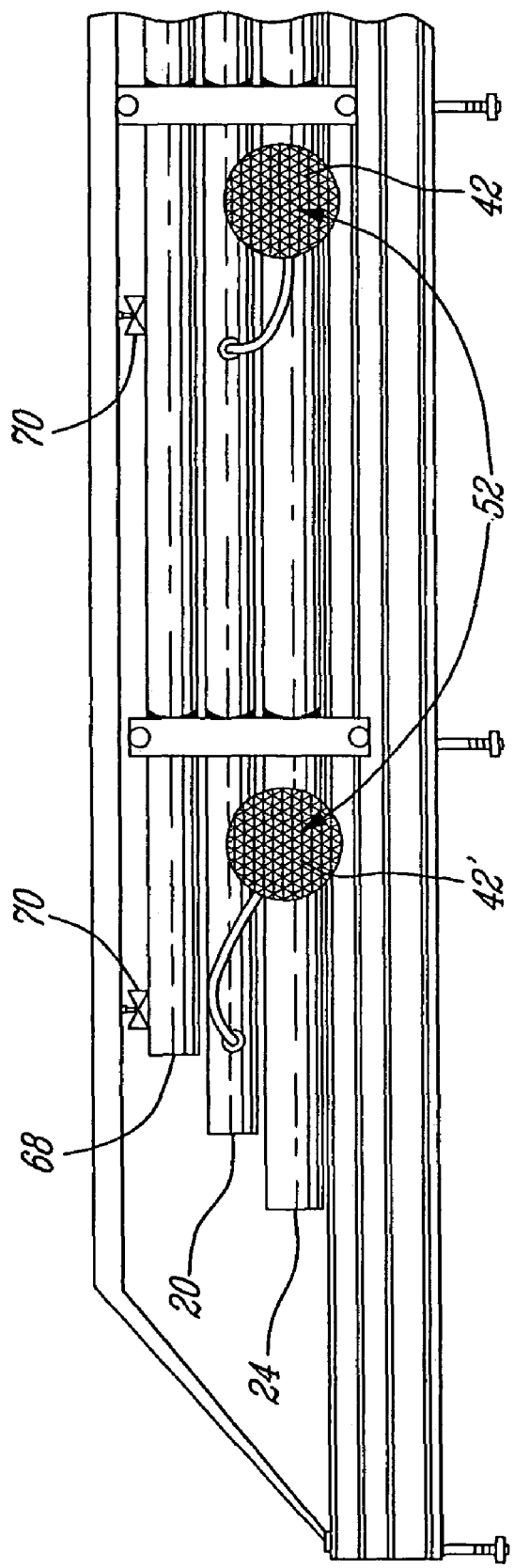
FIG. 5 is a schematic side view of the distribution pipe arrangement shown in FIG. 4.

FIGS. 3 to 5 show a second embodiment of the present invention wherein like reference numerals refer to like parts. According to the second embodiment, each foam generating assembly 28' takes the form of a number of wide-angle full cone nozzles 50 (two in the illustrated embodiment) mounted to a hollow head member 52 at preferably an incident angle of 45 degrees to a screen 42' mounted at an outlet end of the head member 52. Each nozzle 50 is connected in fluid flow communication to the foam liquid supply line 20. The head member 52 has a central air inlet 54 at a root thereof opposite the screen 42'. The air inlet 54 is connected in fluid flow communication to the air supply line 24. As shown in FIGS. 4 and 5, the head members 52 of the foam generating assemblies 28' can be conveniently directly mounted to the air supply line 24 at regular intervals therealong. The air inlet 54 of each head member 52 is preferably provided with an appropriate fitting for allowing easy assembly and disassembly thereof on the air supply line 24 within the roof/wall cavities of the building structure.

As shown in FIG. 4, the air supply line 24 and the foam liquid supply line 20 both extends longitudinally centrally within a roof cavity 56 between an outer roof membrane 58 and an inner roof membrane 60. The head members 52 are distributed longitudinally along the air supply line 24 within the roof cavity 56 to provide multiple foam generating points therewithin in order to periodically fill the same with degradable foam.

Each head member 52 has a large cylindrical portion 62 and a frustoconical portion 64 converging into a small cylindrical portion 66. The screen 42' is mounted at the distal end of the cylindrical portion 62. The air inlet 54 is provided at the distal end of the small cylindrical portion 66. The nozzles 50 are mounted to the frustoconical portion 64 so as to be inclined at about 120 degrees.

In the embodiment illustrated in FIG. 3, the nozzles 50 are at about a distance of 47 mm from the screen 42' and operate at a pressure varying between 20 to 30 psi. The nozzles 50 are positioned and operate in order to keep the full area of the screen 42' continuously wet. The nozzles 50 are of standard construction. The screen 42' can be made from a 3 mm scouring cloth such as fleece used to wash dishes.

The air is fed to each head member 52 at a low pressure of about 1 to 7 psi. Airflow to the head members 52 is regulated by a fixed metering orifice defined by the air inlet 54 of each head member.

In use, soap liquid is sprayed onto the entire surface of the screen 42' by the nozzles 50. As the air fed into the head members 52 via the air inlets 54 thereof flows through the screen 42', foam is generated.

The wetness of the foam generated through the screen 42' can be controlled by the flow of the nozzles 50 and by the type of surfactant; varying the type of screen 42' can also influence the bubble size.

As shown in FIGS. 4 and 5, a third pipe 68 is preferably also mounted within the roof cavity 56 to supply a series of sprinklers 70 with a washing liquid in order to periodically wash the roof membranes 58 and 60. The soap liquid resulting from the degradation of the bubbles in the roof cavity 56 can advantageously be recuperated and used as the washing liquid. Alternatively, the third pipe 68 could be connected to a source of water. The sprinklers 70 are preferably uniformly distributed on top of the third pipe 68.

The embodiments of the invention described above are intended to be exemplary. Those skilled in the art will therefore appreciate that the forgoing description is illustrative only, and that various alternatives and modifications can be devised. Accordingly, the present is intended to embrace all such alternatives, modifications and variances which fall within the scope of the appended claims.

The invention claimed is:

1. A periodically shieldable solar structure comprising at least one cavity formed between a pair of light transmitting members, and a foam insulation/shading system for periodically filling said at least one cavity with degradable foam, said foam insulation/shading system comprising an air supply pipe connected to a source of low-pressure air and extending along said at least one cavity, a foaming solution supply pipe connected to a source of foaming solution and extending along said at least one cavity, and a series of axially spaced-apart foam generators mounted within said at least one cavity and distributed therealong to provide multiple discrete points of mixture for the air and foaming solution as well as multiple foam outlet points within each single one of said at least one cavity, the foam generators being located in an upper end portion of the at least one cavity, the low pressure air and the foaming solution being separately supplied to said foam generators via said air supply pipe and said foaming solution supply pipe to locally produce the foam at each of said axially spaced-apart foam generators, each of the foam generators having a body defining a chamber, the chamber having an outlet provided with a screen, each foam generator further having an air inlet configured to provide for a flow of low-pressure air from the air supply pipe to the chamber and at least one nozzle connected to the foaming solution pipe for directly spraying the foaming solution onto an inner face of the screen such that foam is generated by the low-pressure air released through the screen, the axis of the at least one nozzle intersecting the screen.

2. The solar structure as defined in claim 1, wherein the air inlet is centrally located with respect to the screen and in opposed facing relationship with respect thereto.

3. The solar structure as defined in claim 1, wherein the at least one nozzle is mounted at an angle to a central axis of each foam generator, the screen being substantially perpendicular to said central axis.

4. The solar structure as defined in claim 1, wherein said body has a cylindrical root portion merging into an intermediate frustoconical portion ending into a cylindrical discharge end portion, said cylindrical discharge end portion being of greater cross-sectional area than said cylindrical root portion, said screen being mounted atop of said cylindrical discharge end portion, said air inlet being provided through a bottom surface of said cylindrical root portion, and said at least one nozzle mounted to said intermediate frustoconical portion angularly to said air inlet and said screen.

5. A foam insulation/shading system in combination with a transparent building structure having at least one cavity formed between a pair of light-transmitting members, the system comprising a source of low-pressure air, a source of foaming solution, and a series of foam generators mounted at axially spaced-apart locations along an upper end portion of each of said at least one cavity to provide discrete points of mixture for the low-pressure air and the foaming solution as well as multiple foam generating points in each individual one of said at least one cavity, the low-pressure air and the foaming solution being separately and independently supplied to each of said foam generators to locally produce the foam at various locations within the at least one cavity, each of said foam generators comprising a hollow head member mounted to an air supply pipe and defining an internal volume, the hollow head member having a porous outlet face and an air inlet connected to the source of low-pressure air via the air supply pipe for directing air through said porous outlet face, and at least one nozzle connected to the source of foaming solution and arranged for spraying the foaming solution directly onto said porous outlet face, a spray axis of the at least one nozzle intersecting the porous outlet face.

6. The combination as defined in claim 5, wherein said head member has a root portion merging into an intermediate widening portion ending into a discharge end portion, said discharge end portion being of greater cross-sectional area than said root portion, said porous outlet face being provided at a distal end of said discharge end portion, said air inlet being provided through a bottom of said root portion, and wherein at least one nozzle is mounted to said intermediate widening portion angularly to said air inlet and said screen.

* * * * *